US011283596B2

(12) United States Patent
Chalakudi et al.

(10) Patent No.: US 11,283,596 B2
(45) Date of Patent: *Mar. 22, 2022

(54) API REQUEST AND RESPONSE BALANCING AND CONTROL ON BLOCKCHAIN

(71) Applicant: AMERICAN EXPRESS TRAVEL RELATED SERVICES COMPANY, INC., New York, NY (US)

(72) Inventors: Shyamala Chalakudi, Phoenix, AZ (US); Ming Yin, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 356 days.

This patent is subject to a terminal disclaimer.

(21) Appl. No.: 16/589,894

(22) Filed: Oct. 1, 2019

(65) Prior Publication Data

US 2020/0136843 A1 Apr. 30, 2020

Related U.S. Application Data

(63) Continuation of application No. 15/785,870, filed on Oct. 17, 2017, now Pat. No. 10,469,248.

(51) Int. Cl.
*H04L 9/06* (2006.01)
*H04L 29/06* (2006.01)
*H04L 9/32* (2006.01)

(52) U.S. Cl.
CPC .......... *H04L 9/0637* (2013.01); *H04L 9/0618* (2013.01); *H04L 9/3236* (2013.01);
(Continued)

(58) Field of Classification Search
CPC .................................................... H04L 9/0637
See application file for complete search history.

(56) References Cited

U.S. PATENT DOCUMENTS 10,291,413 B2 * 5/2019 Ramathal .............. H04L 9/3247
10,374,795 B1 8/2019 Giobbi
(Continued)

OTHER PUBLICATIONS

Non-Final Office Action dated Sep. 19, 2019 in U.S. Appl. No. 15/682,180.
(Continued)

*Primary Examiner* — Bradley W Holder
(74) *Attorney, Agent, or Firm* — Thomas | Horstemeyer, LLP

(57) ABSTRACT

A balancing and control (B&C) system for API transactions is disclosed. The system may write a request confirmation and a request acknowledgement to a blockchain in response to an API request being transmitted from a consumer system to a provider system, with the request confirmation and the request acknowledgement each comprising a request hash of the API request. The system may also write a response confirmation and a response acknowledgement to the blockchain in response to an API response being transmitted from the provider system to the consumer system, with the response confirmation and the response acknowledgement each comprising a response hash of the API response. The blockchain may execute a smart contract to compare the request hashes from the request confirmation and the request acknowledgement and the response hashes from the response confirmation and the response acknowledgement to identify one or more out-of-balance events.

20 Claims, 3 Drawing Sheets

(52) U.S. Cl.
CPC .......... *H04L 9/3239* (2013.01); *H04L 9/3297* (2013.01); *H04L 63/0435* (2013.01); *H04L 63/0442* (2013.01); *H04L 63/061* (2013.01); *H04L 2209/38* (2013.01)

(56) References Cited

U.S. PATENT DOCUMENTS

| | | | |
|---|---|---|---|
| 10,579,974 B1* | 3/2020 | Reed | G06Q 20/105 |
| 2015/0262137 A1 | 9/2015 | Armstrong | |
| 2016/0012495 A1 | 1/2016 | Sharp | |
| 2016/0300223 A1 | 10/2016 | Grey et al. | |
| 2017/0148016 A1* | 5/2017 | Davis | G06Q 20/389 |
| 2018/0025181 A1* | 1/2018 | Barinov | G06F 21/645 |
| | | | 726/26 |
| 2018/0285839 A1 | 10/2018 | Yang | |
| 2018/0315141 A1 | 11/2018 | Hunn | |
| 2018/0349621 A1 | 12/2018 | Schvey | |
| 2019/0036698 A1 | 1/2019 | Anglin | |
| 2019/0057379 A1 | 2/2019 | Chalakudi | |
| 2019/0116142 A1 | 4/2019 | Schvey | |
| 2019/0116174 A1 | 4/2019 | Gray | |

OTHER PUBLICATIONS

Notice of Allowance dated Jul. 8, 2019 in U.S. Appl. No. 15/785,870.

Zyskind et al.; Decentralizing Privacy: Using Blockchain to Protect Personal Data; Published in: 2015 IEEE Security and Privacy Workships; Date of Conference: May 21-22, 2015; IEEE Xplore (Year: 2015).

Gervais et al.; Tampering with the Delivery of Blocks and Transactions in Bitcoin; Published in CCS-15 Proceedings of the 220d ACM SIGSAC Conference on Computer and Communications Sercurity; 2015; pp. 692-705; ACM Digital Library (Year: 2015).

* cited by examiner

API REQUEST AND RESPONSE BALANCING AND CONTROL ON BLOCKCHAIN

CROSS REFERENCE TO RELATED APPLICATIONS

This application is a continuation of, claims priority to and the benefit of, U.S. Ser. No. 15/785,870 filed Oct. 17, 2017 and entitled "API REQUEST AND RESPONSE BALANCING AND CONTROL ON BLOCKCHAIN," which is hereby incorporated by reference in its entirety for all purposes.

FIELD

This disclosure relates to balancing and control for application programming interface (API) requests and API responses using a distributed database.

BACKGROUND

Data transfer policies (e.g., messaging transfer, API requests and API responses) often include an audit of past data transfers to determine that the data transfers were accurate. For example, auditors may check past data transfers to verify that credit applications previously submitted to financial institutions were indeed accurate. Balancing and Control (B&C) is the process to ensure data transfer between systems is accurate, complete and on-time. B&C processes may be implemented to ensure the accuracy, completeness and timeliness of a data transfer between systems. A data transfer with the B&C monitoring processes in place typically involves a sending system and a receiving system both in communication with a third party intermediary. The sending system transmits the data to the receiving system, and the sending system and receiving system send a trigger containing B&C information to the third party, which the third party then uses that information to validate data transfers.

Including a third party in each data transfer can be problematic. The third party typically uses proprietary systems and software, which increase development time and time to market on new projects that interact with the third party systems. The third party also adds application design complexity, as engineers have to implement solutions compatible with the third party systems. For example, typical third party systems may be built on mainframe, and may be unable to provide B&C and B&C monitoring processes for API transmissions. The third party systems also introduce an additional point of failure into the B&C systems. The third party may be the central authority in the B&C process; however, the third party may not be tamper-proof with respect to the B&C data the third party receives.

SUMMARY

A system, method, and computer readable medium (collectively, the "system") is disclosed for a balancing and control system using a distributed database (e.g., a blockchain). The system may write to a blockchain an API request confirmation in response to a service consumer system transmitting an API request to a service provider system, wherein the API request confirmation comprises a transaction ID, a service provider system address, a service consumer system address, and a first request hash of the API request. The system may write to the blockchain an API request acknowledgement in response to the service provider system receiving the API request from the service consumer system. The API request acknowledgement comprises the transaction ID, the service provider system address, the service consumer system address, and a second request hash of the API request. The system may write to the blockchain an API response confirmation in response to the service provider system receiving the API request and transmitting an API response to the service consumer system. The API response confirmation comprises the transaction ID, the service provider system address, the service consumer system address, and a first response hash of the API response. The system may write to the blockchain an API response acknowledgement in response to the service consumer system receiving the API response from the service provider system. The API response acknowledgement comprises the transaction ID, the service provider system address, the service consumer system address, and a second response hash of the API request. The blockchain executes a smart contract to compare the first request hash of the API request to the second request hash of the API request to identify a request out-of-balance event, and the first response hash of the API response to the second response hash of the API response to identify a response out-of-balance event. The system may read from the blockchain, via a monitoring device, at least one of the request out-of-balance event or the response out-of-balance event.

In various embodiments, the system may generate an out-of-balance alert in response to reading at least one of the request out-of-balance event or the response out-of-balance event. The consumer system address may comprise a first public key corresponding to a first private key of a first asymmetric cryptography key pair, and the provider system address may comprise a second public key corresponding to a second private key of a second asymmetric cryptography key pair. The system may further register on the blockchain the service consumer system by assigning to the service consumer system the first public key and the first private key of the first asymmetric cryptography key pair. The system may further register on the blockchain the service provider system by assigning to the service provider system the second public key and the second private key of the second asymmetric cryptography key pair.

In various embodiments, the request confirmation may comprise a first timestamp, the request acknowledgement comprises a second timestamp, the response confirmation comprises a third timestamp, and the response acknowledgement comprises a fourth timestamp. The system may identify a request timeout out-of-balance event in response to the second timestamp of the request acknowledgement not being within a predetermined time window relative to the first timestamp of the request confirmation. The system may identify a response timeout out-of-balance event in response to the fourth timestamp of the response acknowledgement not being within the predetermined time window relative to the third timestamp of the response confirmation.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
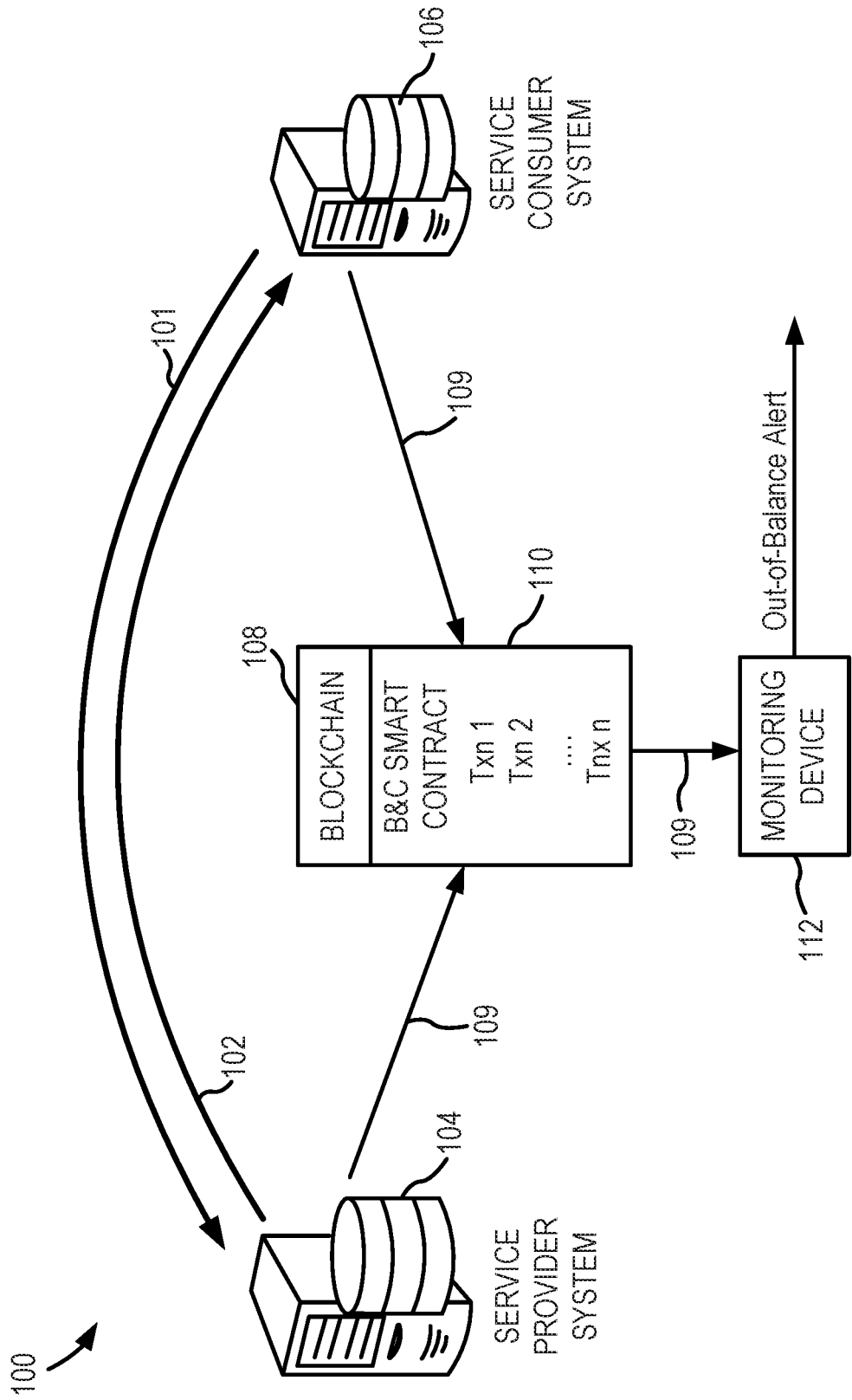
FIG. 1 illustrates an exemplary system for API transaction balancing and control using smart contracts and storing data on a blockchain, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A balancing and control system based on peer-to-peer application programming interface (API) transactions (e.g., requests and responses) may be used to facilitate any type of balancing and control of API requests and responses without (or with minimal) third party intervention. For example, a blockchain driven peer-to-peer API transaction network enables near-instant logging and validation of API requests and responses. For a blockchain-based peer-to-peer API transaction system, a governing organization or consortium may control access to data stored on the blockchain. Registration with the managing organization(s) may enable participation in the API transaction network. In various embodiments, the balancing and control system discussed herein may solve a technical limitation of the prior art by providing balancing and control capabilities to API transactions.

The balancing and control systems described herein may use a distributed database, which may be based on a blockchain and have consensus based transaction validation. The present disclosure may allow for real-time or near real-time balancing and control of API transactions, including in one to one interactions such as during two-way communications (e.g., a service consumer sends requests and a service provider sends responses). In that respect, the disclosure may allow for decreased response times and increased accuracy for the balancing and control of API transactions while also providing a tamper-proof repository, compared to solutions in the prior art and human capabilities. Such balancing and control systems may also enable smart contracts that enforce API transaction workflows in a decentralized manner and keep track of completed requests and responses. The smart contracts may additionally comprise business rules and/or logic to ensure proper and complete API transactions. The balancing and control systems may also include applications deployed on user devices such as, for example, computers, tablets, smartphones, Internet of Things devices (IoT devices), etc. The applications may communicate with the blockchain to store API transaction information such as a request confirmation and/or acknowledgement, a response confirmation and/or acknowledgement, a transaction ID, a transaction hash, a source address, a destination address, a time stamp, or other data relating to the API transaction.

The system further improves the functioning of the computer and/or networked environment. For example, by automating the balancing and control of API transactions, as opposed to needing a user, third party, or the like to manually perform balancing and control operations on API transactions, the user performs less computer functions and provides less input, which saves on data storage and memory, thus speeding processing in the computer and/or networked environment. The system may further automate the balancing and control of message transfers by leveraging shared (e.g., internal or external) blockchain infrastructure without needing an additional investment for dedicated application and database servers to host a third-party balancing and control system. In that regard, the system may significantly reduce time-to-market and cost of application development. As discussed further herein, the blockchain software can run on any suitable type of hardware, including personal computers. The blockchain may manage the data storage efficiently using a Merkle tree structure.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, data for storage, and the like in digital or any other form.

With reference to FIG. 1, a balancing and control (B&C) system 100 is depicted according to various embodiments. B&C system 100 may include various computing devices and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

B&C system 100 may comprise a service provider system 104 in electronic communication with a service consumer system 106. As discussed further herein, service consumer system 106 may be configured to transmit an API request 101 to service provider system 104. In response to receiving API request 101, service provider system 104 may be configured to transmit an API response 102 back to service consumer system 106. API request 101 may comprise any suitable API request having any suitable format. API request 101 may comprise various parameters, queries, and/or values. API response 102 may comprise any suitable API response having any suitable format. API response 102 may comprise various values, output, or the like, and may correspond to the parameters, queries, and/or values specified in API request 101.

Service consumer system 106 and/or service provider system 104 may include at least one computing device in the form of a computer or processor, or a set of computers/processors, although other types of computing units or systems may be used. Exemplary computing devices include servers, pooled servers, laptops, notebooks, hand held computers, personal digital assistants, cellular phones, smart phones (e.g., iPhone®, BlackBerry®, Android®, etc.) tablets, wearables (e.g., smart watches, smart glasses, smart rings, etc.), Internet of things (IOT) devices, smart speakers, or any other device capable of transmitting and/or receiving data over network 109. Each computing device may run applications to interact with blockchain 108, transfer data over a network with other computing devices, transmit API requests or API responses, perform crypto operations, and otherwise operate within B&C system 100. A blockchain address may be uniquely assigned to an application or computing device to function as a unique identifier for each respective application or computing device.

Blockchain 108 may be a distributed database that maintains records in a readable manner and that is resistant to tampering. Blockchain 108 may comprise a system of interconnected blocks containing data. The blocks can hold transfer data, smart contract data, and/or other information as desired. Each block may link to the previous block and may include a timestamp. When implemented in support of B&C system 100, blockchain 108 may serve as an immutable log for API transactions and related communications. Blockchain 108 may be a peer-to-peer network that is private, consortium and/or public in nature (e.g., Ethereum, Bitcoin, etc.). Consortium and private networks may offer improved control over the content of blockchain 108 and public networks may leverage the cumulative computing power of the network to improve security. In that regard, blockchain 108 may be implemented using technologies such as, for example, Ethereum GETH, eth-lightwallet, or other suitable blockchain interface technologies.

Blockchain 108 may be maintained on various nodes in the form of copies of the blockchain. Validation of API transactions may be added to blockchain 108 by establishing consensus between the nodes based on proof of work, proof of stake, practical byzantine fault tolerance, delegated proof of stake, or other suitable consensus algorithms.

The various electronic communications of B&C system 100 including the transfers of API request 101 and/or API response 102, writing API transaction confirmations to blockchain 108, writing API transaction acknowledgements to blockchain 108, and/or reading data from blockchain 108 may be accomplished using a network 109. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g. IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

In various embodiments, service consumer system 106 may be configured to write a request confirmation to blockchain 108 in response to transmitting an API request. Service provider system 104 may be configured to write a response confirmation to blockchain 108 in response to transmitting an API response. The request confirmation and response confirmation may include metadata related to the API transaction as known by service provider system 104 or service consumer system 106. The metadata for a given API transaction may include data such as, for example, a transaction ID, a transaction hash, a source address, a destination address, a time stamp, an application name, an application ID, or other data relating to the API transaction.

In various embodiments, the source address and destination address may be blockchain addresses. Each system and/or application may have a unique blockchain address such that the blockchain address identifies systems and/or applications on a one-to-one basis. The address may be the public key of an asymmetric cryptography public/private key pair assigned to a system and/or application. An alias or other identifying number associated with the public key may also be used in the source and/or destination address fields. For example, service consumer system 106 may have a consumer system address comprising a first public key corresponding to a first private key of a first asymmetric cryptography key pair. Service provider system 104 may have a provider system address comprising a second public key corresponding to a second private key of a second asymmetric cryptography key pair.

The transaction hash may be the result of a hash function applied to the API request by service consumer system 106 and/or to the API response by service provider system 104. The transaction hash may be taken using any cryptographic hash function such as, for example, SHA-1, SHA-256, checksum, or MD5. The transaction hash may be compared to a second transaction hash made by the corresponding service consumer system 106 or service provider system 104, by applying the same hash function as the respective service provider system 104 and/or service consumer system 106 applied to the respective API request or API response. A matching hash indicates that service provider system 104 or service consumer system 106 transmitted the same API transaction as was received at the corresponding service consumer system 106 or service provider system 104, as discussed further herein.

In various embodiments, service provider system 104 may be configured to write a request acknowledgement to blockchain 108 in response to receiving the API request transmitted by service consumer system 106. Service consumer system 106 may be configured to write a response acknowledgement to blockchain 108 in response to receiving the API response transmitted by service provider system 104. The request acknowledgement and response acknowledgment may include metadata related to the API transaction as known by service provider system 104 and service consumer system 106. The metadata for a given API transaction may include data such as, for example, a transaction ID, a transaction hash, a source address, a destination address, a time stamp, an application name, an application ID, or other data relating to the API transaction. The metadata contained in the request acknowledgement from service provider system 104 may be compared to the metadata contained in the request confirmation from service consumer system 106. The metadata contained in the response acknowledgement from service consumer system 106 may be compared to the metadata contained in the response confirmation from service provider system 104.

Nodes of blockchain 108 may be configured to add data to blockchain 108 in response to API calls that invoke a smart contract 110 on blockchain 108. Smart contract 110 may be an executable that writes data to blockchain 108 in a predetermined format based on predetermined function parameters passed by an API call. Smart contract 110 may take as an input the fields included for writing with each transaction such as, for example, a transaction ID, a transaction hash, a source address, a destination address, a time stamp, an application name, an application ID, or other data relating to the API transaction. Each of the above described API transactions, and as discussed further herein, may be written to blockchain 108 separately.

In various embodiments, blockchain 108 may host smart contracts 110 that autonomously govern the logging and validation of API transactions by supporting execution and recording of the transfer data. Blockchain 108 may be based on blockchain technologies such as, for example, Ethereum, Open Chain, Chain Open Standard, etc. Smart contract 110 controls the end-to-end flow of the system. Smart contract 110 is also configured to maintain historic records of API transactions by writing a historic record of hashes and addresses on blockchain 108. Smart contract 110 may also implement and comprise various business rules. For example, smart contract 110 may implement logic that a pair of request confirmations and request acknowledgments, or response confirmations and response acknowledgements, comprising the same transaction ID may not be submitted and written to blockchain 108 more than once. In response to detecting duplication transmissions comprising the same transaction ID, smart contract 110 may execute processes to generate an out-of-balance event, a reporting error, an information management record (IMR), or the like, as discussed further herein. Smart contract 110 may include a program written in a programming language such as, for example, Solidity, or any other suitable programming language.

In various embodiments, a monitoring device 112 may be configured to read data blocks of blockchain 108 to determine if a particular API transaction is in-balance or out-of-balance. Monitoring device 112 may take the form of a computing device in electronic communication with one or more nodes of blockchain 108. Monitoring device 112 may read data blocks written to blockchain 108 to identify the pairs of request confirmations and request acknowledgements and response confirmations and response acknowledgements, based on some combination of the metadata associated with the API transaction (e.g., a transaction ID, a transaction hash, a source address, a destination address, a time stamp, an application name, an application ID, etc.).

Blockchain 108 may be configured to compare the request hash of the API request transmitted by service consumer system 106 to the request hash of the API request as received by service provider system 104. Blockchain 108 may also be configured to compare the response hash of the API response transmitted by service provider system 104 to the response hash of the API response as received by service consumer system 106.

Blockchain 108 may make the comparisons using smart contract 110. The comparisons may determine whether the transmitted request hash and received request hash match, and/or whether the transmitted response hash and received response hash match. In response to the transmitted request hash being identical to the received request hash and/or the transmitted response hash being identical to the received response hash, monitoring device 112 may determine that the API transaction was completed with the respective API request or API response being unchanged between transmission and receipt (e.g., the API transaction was in-balance). In response to the transmitted request hash being different from the received request hash and/or the transmitted response hash being different from the received response hash, monitoring device 112 may determine that the API transaction was completed with an error (e.g., the API transaction was out-of-balance) based on the respective API request and/or API response being changed between transmission and receipt. The result of the comparisons may be written to blockchain 108 in response to execution of smart contract 110 that executes the comparisons. Monitoring device 112 may read blockchain 108 to determine whether the API request and/or API response was completed with an error. For example, an error may be detected in response to not receiving a request acknowledgement from service provider system 104 within a predetermined duration window from the request confirmation being transmitted by service consumer system 106. The predetermined duration may be measured from the timestamp included in the request confirmation, request acknowledgement, response confirmation, and/or response acknowledgment. The timestamp may be retrieved, for example, using a web API.

Monitoring device 112 may also be configured to identify an error in response to the request hash transmitted by service consumer system 106 contradicting the request acknowledgement received by service provider system 104, or in response to the response hash transmitted by service provider system 104 contradicting the response acknowledgement received by service consumer system 106. Two hashes may be said to contradict when the values of the hash do not match. For example, the hash value of "ADE2 5D93" contradicts the hash value of "5A60 285B" because the hash values are not the same. The foregoing 8-byte hash values serve as an example only and are not meant to be limiting. Hash functions used in the present disclosure may generate hash values of any size such as, for example, 16 byte, 32 byte, 64 byte, 128 byte, 256 byte, or any other suitable size hash values may be used. Identification of an error may include generating an out-of-balance alert. The out-of-balance alert may comprise a ticket or alert identifying the API request or API response that triggered the error. The out-of-balance alert may be transmitted to a user, triage system, maintenance system, or the like. The error may be flagged for further investigation and/or resolution.

In various embodiments, B&C system 100 may use a Hierarchical Deterministic (HD) solution and may use BIP32, BIP39, and/or BIP44, for example, to generate an HD tree of public addresses. B&C system 100 may include various computing devices configured to interact with blockchain 108 either via a blockchain client, such as GETH, or via API calls using a blockchain as a service provider, such as MICROSOFT AZURE® or Blockapps STRATO, for example. The various computing devices of B&C system 100 may be configured to store API transaction records and execute smart contracts using blockchain 108 for data storage and/or validation. Smart contracts 110 may be completed by digital signature using asymmetric crypto operations and a private key, for example.

Figure 2:
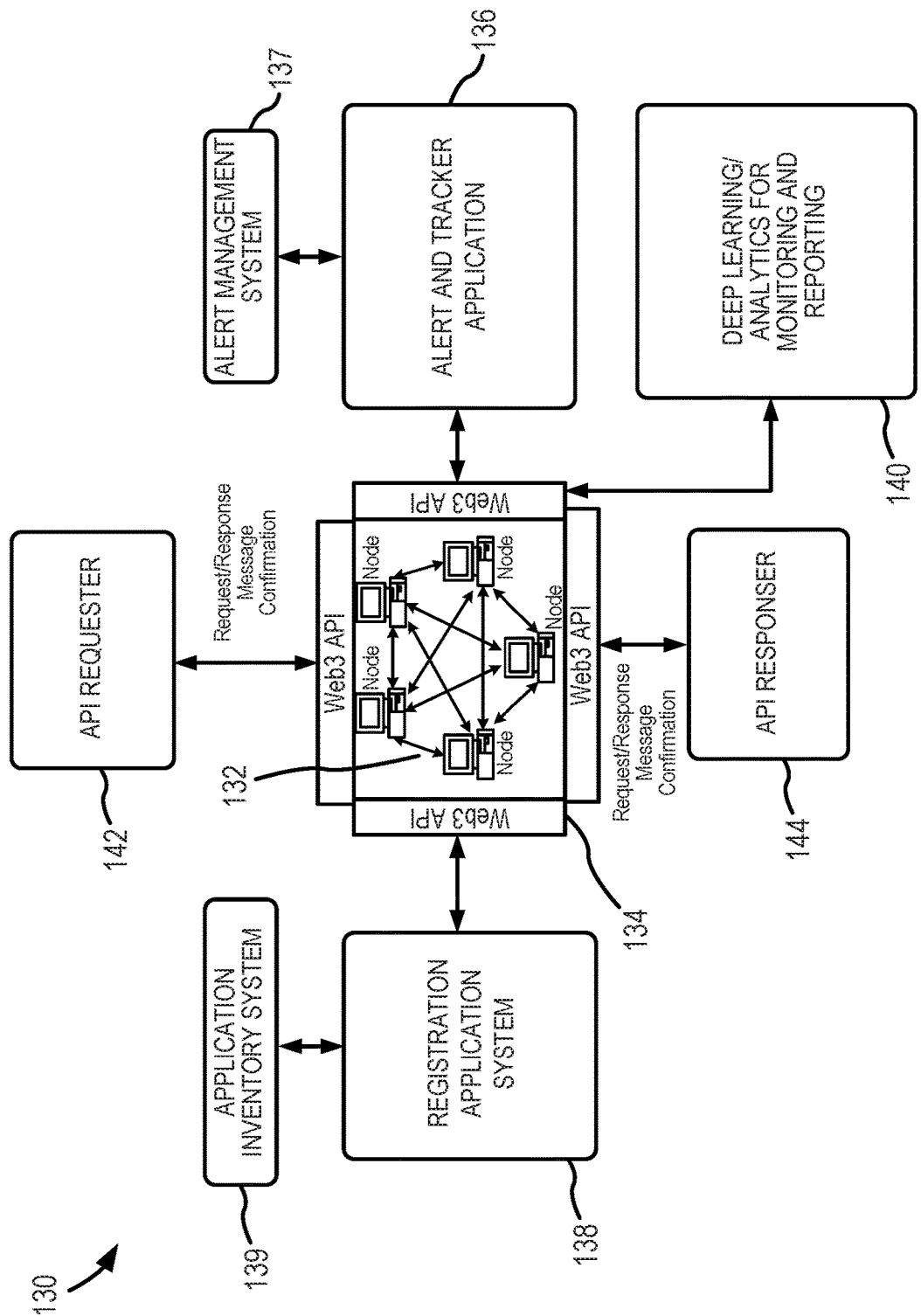
FIG. 2 illustrates a system architecture for an API transaction balancing and control system using smart contracts and storing data on a blockchain, in accordance with various embodiments.

With reference to FIG. 2, and continued reference to FIG. 1, system architecture 130 is shown with various software components of a computer-based B&C system in electronic communication, in accordance with various embodiments. System architecture 130 depicts blockchain nodes 132, which maintain copies of blockchain 108 and validate new writes to blockchain 108. Blockchain nodes 132 interface with outside applications and computing devices (e.g., service provider system 104 and/or service consumer system 106) using an application programming interface (API) 134 such as, for example, a web3 API compatible with the blockchain maintained by the Ethereum® consortium. API 134 may enable computing devices and applications to communicate with blockchain 108 and execute smart contracts 110 by making API calls and passing the appropriate parameters or arguments. For example, an API call to write a request confirmation to blockchain 108 may include transfer data such as a transaction ID, a transaction hash, a source address, a destination address, a time stamp, an application name, an application ID, or other data relating to the API transaction.

In various embodiments, various computing devices and applications (e.g., monitoring device 112, service provider system 104, and/or service consumer system 106) may also communicate with blockchain 108 using API 134. For example, the various computing devices may be configured to interface with system architecture 130 by downloading or installing a virtual image allowing the computing device to connect to the Ethereum® network via web3 API, as discussed further herein. In that respect, system architecture 130 may enable plug-in-play capabilities amongst computing devices. Service provider system 104 and/or service consumer system 106 may run an API requester 142 that communicates with blockchain 108 by making API calls using API 134. Service consumer system 106 and/or service provider system 104 may run a API responser 144 that communicates with blockchain 108 by making API calls using API 134. API requester 142 and/or API responser 144 may register with blockchain 108 using an application registration system 138 that assigns a unique blockchain address and/or a unique public/private cryptographic key pair to each application. The blockchain address, public key, and/or private key may be stored in a central asset registry or application inventory system 139 in association with an identifier (e.g., an application ID) that identifies the registered application. The blockchain address, public key, and/or private key may serve as a unique identifier for registered applications based on the one-to-one relationship between the registered application and corresponding blockchain address, public key, and/or private key.

In various embodiments, monitoring device 112 may run an alert and tracker application 136. Blockchain 108 may execute smart contract 110 to carry out the comparison between the transmitter's hash and receiver's hash received by blockchain 108. Smart contract 110 of blockchain 108 may identify out-of-balance API transaction events based on the results of the hash comparison. The result of the comparison may be pushed to alert and tracker application 136 running on monitoring device 112 by way of an API to identify an out-of-balance API transaction event. For example, alert and tracker application 136 may identify an out-of-balance API transaction event in response to the first hash of the API request conflicting (i.e., not matching) with the second hash of the API request by consuming the notifications received from blockchain 108. Alert and tracker application 136 may read the results of the comparison received from blockchain 108 to detect the result of the comparison between the first hash and the second hash of the API transaction. In response to detecting an out-of-balance API transaction event, alert and tracker application 136 may generate an information management record (IMR) containing data indicative of the out-of-balance API transaction event and may transmit the IMR to an alert management system 137. The out-of-balance API transaction event may be flagged for further investigation and/or resolution.

In various embodiments, smart contract 110 of blockchain 108 may also compare the hash value of specific field(s) in the API transaction before and/or after the API transaction. The additional hash value comparison may help to identify what field(s) caused the out-of-balance API transaction event. Smart contract 110 of blockchain 108 may also invoke another smart contract for scheduled jobs (See, e.g., http://www.ethereum-alarm-clock.com/ for scheduled jobs in the Ethereum consortium). In that regard, smart contract 110 can also detect an out-of-balance scenario such as where the receiver did not receive the API transaction transmitted from the transmitter within a predefined time window, as discussed further herein.

In various embodiments, additional supporting applications and computing devices in communication with blockchain nodes 132 via API 134 may include an analytics application 140 for a monitoring and reporting system. Analytics application 140 may support a dashboard application to present insights relating to conforming and non-conforming API transaction. Analytics application 140 may run at least partially on a big data management system and/or a distributed computing cluster.

A B&C network based on a blockchain, as described herein, may simplify B&C operations by using the blockchain as a distributed and tamper-proof data store. The verification process for API transaction may be near-instant. The disclosure may be integrated into ecommerce platforms reliant on accurate API transaction such as, for example, credit applications and/or similar communications involving sensitive data. Transparency is very high for various embodiments using a consortium or public blockchain since validation is performed, for example, using data stored by a decentralized autonomous organization (DAO) instead of a specific financial institution.

Figure 3:
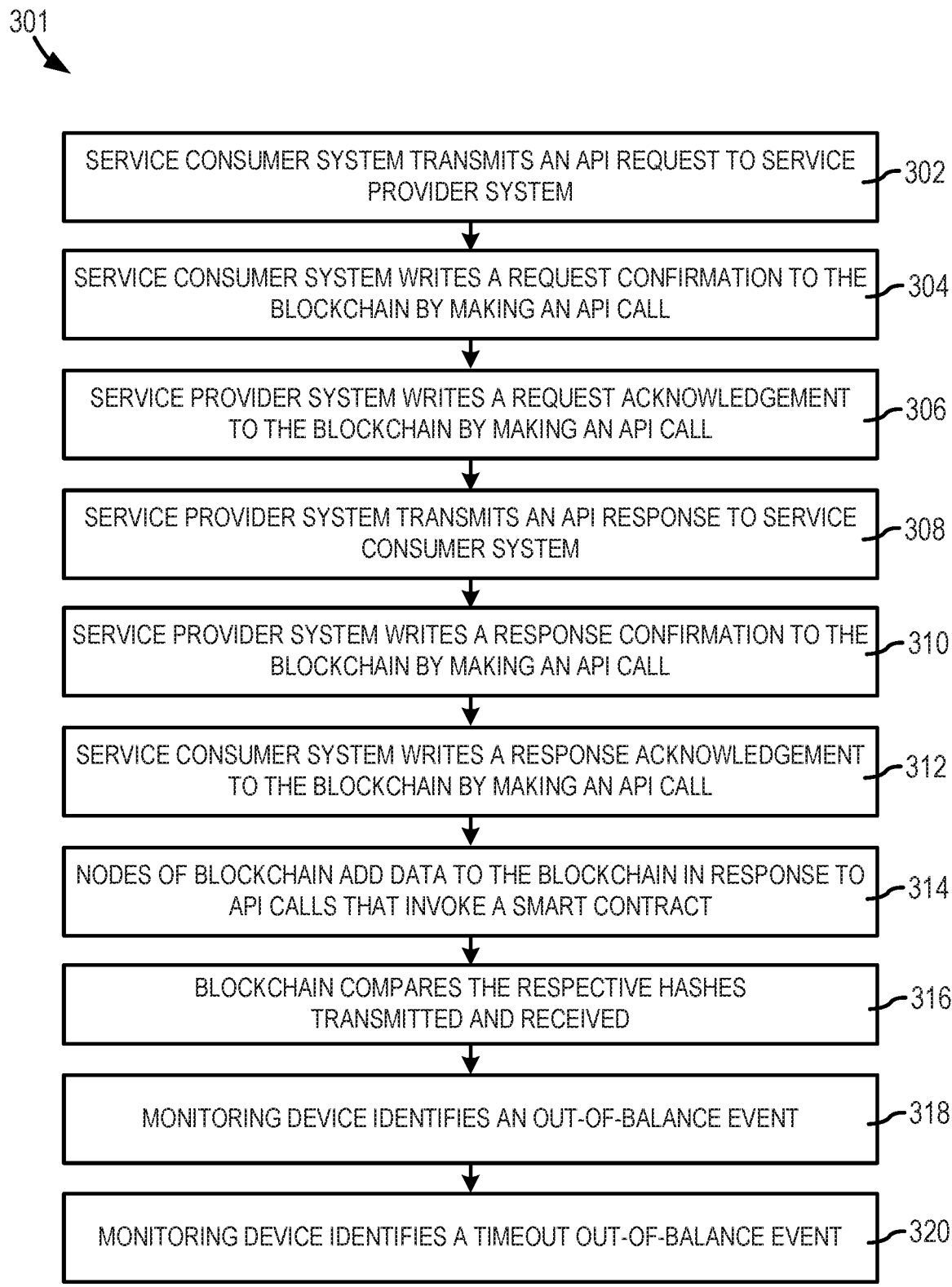
FIG. 3 illustrates a process for API transaction balancing and control on a blockchain, in accordance with various embodiments.

Referring now to FIG. 3, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIG. 3, but also to the various system components as described above with reference to FIG. 1.

With specific reference to FIG. 3, and continued reference to FIG. 1, an API balancing and control process 301 for API requests and API responses is disclosed, in accordance with various embodiments. The API requests and API responses may be transmitted and received during an API transaction. For example, process 301 may include various steps, such as the following: Service consumer system 106 transmits an API request to service provider system 104 (step 302). Service consumer system 106 writes a request confirmation to blockchain 108 by making an API call (step 304). Service provider system 104 writes a request acknowledgment to blockchain 108 by making an API call (step 306). Service provider system 104 transmits an API response to service consumer system 106 (step 308). Service provider system 104 may be configured to transmit the API response, in response to receiving the API request from service consumer system 106, and after making the API call in step 306 to write the request acknowledgement to blockchain 108. Service provider system 104 writes a response confirmation to blockchain 108 by making an API call (step 310). Service consumer system 106 writes a response acknowledgement to blockchain 108 by making an API call (step 312). Nodes of blockchain add data to blockchain 108 in response to API calls that invoke smart contract 110 (step 314). The nodes of blockchain 108 may be configured to add data to blockchain 108 after each API call, as separate transactions (e.g., after step 304, step 306, step 310, and step 312).

Blockchain 108 compares the respective hashes transmitted and received (step 316). Blockchain 108 may make the comparison using smart contract 110. The comparison may determine whether the transmitted hash matches the received hash. For example, blockchain 108 may compare the request hash transmitted by service consumer system 106 to the request hash received by service provider system 104, or blockchain 108 may compare the response hash transmitted by service provider system 104 to the response hash received by service consumer system 106. Blockchain 108 may make the comparison after a confirmation and acknowledgement pair is written to blockchain 108 (e.g., blockchain 108 conducts the comparison after the request confirmation and request acknowledgement are written, and again after the response confirmation and response acknowledgement are written). Blockchain 108 may also make the comparison collectively after both request and response confirmations and acknowledgements are written to the blockchain (e.g., blockchain 108 conducts the comparison after the request confirmation, request acknowledgement, response confirmation, and response acknowledgement are all written). Blockchain 108 may write the comparison to blockchain 108, in accordance with smart contract 110.

In various embodiments, monitoring device 112 identifies an out-of-balance event (step 318). Monitoring device 112 may read blockchain 108 to determine and identify an out-of-balance event. For example, monitoring device 112 may identify a request out-of-balance event in response to the request hash transmitted by service consumer system 106 contradicting the request hash received by service provider system 104. Monitoring device 112 may identify a response out-of-balance event in response to the response hash transmitted by service provider system 104 contradicting the response hash received by service consumer system 106. Monitoring device 112 may generate an out-of-balance alert in response to detecting the out-of-balance event (e.g., a request out-of-balance alert, a response out-of-balance alert, or a timeout out-of-balance alert). In various embodiments, monitoring device 112 identifies a timeout out-of-balance event (step 320). Monitoring device 112 may identify a timeout out-of-balance event in response to at least one of the request acknowledgement or the response acknowledgement not being received within a predetermined time window, relative to the corresponding request confirmation or response confirmation. Monitoring device 112 may generate a timeout out-of-balance alert in response to detecting the timeout out-of-balance event Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing cluster and/or big data management system may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, messages, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® Postgres Plus Advanced Server® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), or any other suitable database product. Moreover, the databases may be organized in any suitable manner, for example, as data tables or lookup tables. Each record may be a single file, a series of files, a linked series of data fields. or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, and U.S. application Ser. No. 15/728,086 titled SYSTEMS AND METHODS FOR LOYALTY POINT DISTRIBUTION and filed Oct. 9, 2017, the contents of which are each incorporated by reference in their entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3-8, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS' but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of validating and logging API transactions, but the disclosure and claims include specific rules for implementing the outcome of validating and logging API transactions and that render information into a specific format that is then used and applied to create the desired results of validating and logging API transactions, as set forth in *McRO, Inc. v. Bandai Namco Games America Inc.* (Fed. Cir. case number 15-1080, Sep. 13, 2016). In other words, the outcome of validating and logging API transactions can be performed by many different types of rules and combinations of rules, and this disclosure includes various embodiments with specific rules. While the absence of complete preemption may not guarantee that a claim is eligible, the disclosure does not sufficiently preempt the field of validating and logging API transactions at all. The disclosure acts to narrow, confine, and otherwise tie down the disclosure so as not to cover the general abstract idea of just validating and logging API transactions. Significantly, other systems and methods exist for validating and logging API transactions, so it would be inappropriate to assert that the claimed invention preempts the field or monopolizes the basic tools of validating and logging API transactions. In other words, the disclosure will not prevent others from validating and logging API transactions, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, out-of-balance alerts, etc.) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
   writing, by a computer-based system, an application programing interface (API) transaction confirmation including a first hash to a distributed database in response to a first computing device sending an API transaction to a second computing device;
   writing, by the computer-based system, an API transaction acknowledgment including a second hash to the distributed database in response to the second computing device receiving the API transaction from the first computing device;
   comparing, by the computer-based system, the first hash associated with the API transaction confirmation with the second hash associated with the API transaction acknowledgement; and
   identifying, by the computer-based system, an out-of-balance transaction event based on the comparison of the first hash and the second hash.

2. The method of claim 1, wherein the API transaction comprises at least one of an API request or an API response.

3. The method of claim 1, wherein the API transaction confirmation comprises the first hash and at least one of: a transaction identifier (ID), a first computing device address associated with the distributed database, or a second computing device address associated with the distributed database.

4. The method of claim 1, wherein the API transaction acknowledgment comprises the second hash and at least one of: a transaction identifier (ID), a first computing device address associated with the distributed database, or a second computing device address associated with the distributed database.

5. The method of claim 1, wherein the first computing device is associated with a first computing device address comprising a first public key corresponding to a first private key of a first asymmetric cryptography key pair, and the second computing device is associated with a second computing device address comprising a second public key corresponding to a second private key of a second asymmetric cryptography key pair.

6. The method of claim 1, wherein the first hash is a result of a hash function applied to the API transaction by the first computing device.

7. The method of claim 1, wherein the second hash is a result of a hash function applied to the API transaction by the second computing device.

8. A system, comprising:
   a plurality of nodes comprising hardware processors configured to store data according to a consensus agreement among the plurality of nodes; and
   a smart contract executable on at least one of the plurality of nodes, wherein when executed by the at least one of the plurality of nodes, the smart contract causes the at least one of the plurality of nodes to at least:
   write a transaction confirmation to at least one of the plurality of nodes in response to a first computing device sending a transaction to a second computing device, the transaction confirmation including a first hash;
   write a transaction acknowledgment to at least one of the plurality of nodes in response to the second computing device receiving the transaction from the first computing device, the transaction acknowledgement including a second hash; and
   identify an out-of-balance transaction event based on a comparison of the first hash and the second hash.

9. The system of claim 8, wherein the transaction confirmation comprises a first timestamp and the transaction acknowledgment comprises a second timestamp.

10. The system of claim 9, wherein the out-of-balance transaction event is identified based at least in part on a comparison of the first timestamp with the second timestamp.

11. The system of claim 8, wherein the transaction comprises a first transaction, the transaction confirmation comprises a first transaction confirmation, the transaction acknowledgement comprises a first transaction acknowledgement, and when executed by at least one of the plurality of nodes, the smart contract causes at least one of the plurality of nodes to at least:
    write a second transaction confirmation to at least one of the plurality of nodes in response to the second computing device sending a second transaction to the first computing device; and
    write a second transaction acknowledgment to at least one of the plurality of nodes in response to the first computing device receiving the second transaction from the second computing device.

12. The system of claim 8, wherein the first computing device is associated with a first computing device address comprising a first public key corresponding to a first private key of a first asymmetric cryptography key pair, and the second computing device is associated with a second computing device address comprising a second public key corresponding to a second private key of a second asymmetric cryptography key pair.

13. The system of claim 8, wherein the transaction confirmation and the transaction acknowledgement each comprise at least one of: a transaction identifier (ID), a first computing device address associated with the plurality of nodes, or a second computing device address associated with the plurality of nodes.

14. The system of claim 8, wherein the transaction comprises an application programming interface (API) request or an API response.

15. A non-transitory computer readable medium comprising machine-readable instructions that, when executed by a processor, cause the processor to at least:
    write a transaction confirmation to at least one of a plurality of nodes in response to a first computing device sending a transaction to a second computing device, the plurality of nodes storing data according to a consensus agreement among the plurality of nodes;

write a transaction acknowledgment to at least one of the plurality of nodes in response to the second computing device receiving the transaction from the first computing device; and identify an out-of-balance transaction event associated with the transaction based on a comparison of a first data hash included in the transaction confirmation with a second data hash included in the transaction acknowledgement.

16. The non-transitory computer readable medium of claim 15, wherein the first data hash and the second data hash comprise a transaction identifier (ID), a first computing device address associated with the plurality of nodes, a second computing device address associated with the plurality of nodes, and a respective hash.

17. The non-transitory computer readable medium of claim 15, wherein when executed by a processor, the machine-readable instructions cause the processor to at least:

register the first computing device with the plurality of nodes by assigning a first public key and a first private key of a first asymmetric cryptography key pair to the first computing device; and register the second computing device with the plurality of nodes by assigning a second public key and a second private key of a second asymmetric cryptography key pair to the second computing device.

18. The non-transitory computer readable medium of claim 15, wherein the first computing device is associated with a service consumer and the second computing device is associated with a service provider.

19. The non-transitory computer readable medium of claim 15, wherein the out-of-balance transaction event comprises at least one of: a request out-of-balance event, a response out-of-balance event, or a timeout out-of-balance event.

20. The non-transitory computer readable medium of claim 15, wherein the transaction comprises an application programming interface (API) request or an API response.

* * * * *